(54) CAPTION DATA PROCESSING CIRCUIT AND METHOD THEREFOR

(75) Inventor: Seong-bong Kim, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 08/961,887

(22) Filed: Oct. 31, 1997

(30) Foreign Application Priority Data

Jun. 17, 1997 (KR) .................................................. 97-25221

(51) Int. Cl.[7] ................................ H04N 7/00; H04N 7/08
(52) U.S. Cl. .................... 348/465; 348/465; 348/468; 348/467; 348/478
(58) Field of Search .................... 348/465, 467, 348/468, 478, 845.2, 845.3

(56) References Cited

U.S. PATENT DOCUMENTS

| | | | |
|---|---|---|---|
| 5,699,124 | * 12/1997 | Nuber et al. .......................... | 348/465 |
| 5,703,655 | * 12/1997 | Corey et al. .......................... | 348/468 |
| 5,742,352 | * 4/1998 | Tsukagoshi .......................... | 348/468 |
| 5,745,184 | * 4/1998 | Neal ..................................... | 348/468 |
| 5,771,075 | * 6/1998 | Rim et al. ........................ | 348/845.3 |
| 5,818,539 | * 10/1998 | Naimpally et al. .................. | 348/465 |
| 5,841,472 | * 11/1998 | Rim et al. ............................. | 348/390 |
| 5,883,675 | * 3/1999 | Herz et al. ........................... | 348/465 |
| 5,920,572 | * 7/1999 | Washington et al. ................ | 370/535 |

* cited by examiner

Primary Examiner—Reinhard J. Eisenzopf
Assistant Examiner—Paulos Natnael
(74) Attorney, Agent, or Firm—Sughrue, Mion, Zinn, Macpeak & Seas, PLLC

(57) ABSTRACT

A caption data processing circuit in a decoder is provided for decoding a transport stream (TS). The caption data processing circuit extracts presentation information and caption data from an input transport stream and generates a control signal when the caption data of a one-picture unit has been extracted. A caption decoding portion of the circuit decodes the extracted caption data in response to the control signal. A buffer in the circuit stores the decoded caption data so that the presentation timing of the decoded caption data may be controlled based on the presentation information. As a result, the presentation timing of the picture data and caption data are exactly synchronized, thereby displaying the picture along with its correct caption.

16 Claims, 3 Drawing Sheets

CAPTION DATA PROCESSING CIRCUIT AND METHOD THEREFOR

BACKGROUND OF THE INVENTION

The present invention relates to decoding fields. More particularly, it relates to a circuit for processing caption and picture data for synchronous display, in a decoder for decoding a transport stream, and a method of performing such data processing.

This application for a caption data processing circuit and method is based on Korean Patent Application No. 97-25221, which is incorporated herein by reference for all purposes.

Digital video technology can be applied to computer and home appliances as well as communication fields such as video conferencing and video telephones. Particularly, according to the MPEG-2 standard (which is to be adopted as a compression algorithm for digital satellite broadcasting systems, digital cable television and high-definition television) digital information is constituted of elementary streams each for video, audio, and data bit streams, and each of the elementary streams are packetized into a packetized elementary stream (PES) to be transmitted as a transport stream (TS).

Caption data is included in a video elementary stream to then be encoded and transmitted. Thus, a conventional caption data processing circuit, of a decoder for decoding a transport stream, extracts the PES from the transport stream, extracts a video elementary stream from the PES, and separates caption data from the video elementary stream to decode the separated caption data, thus outputting caption image data. Then, the caption image data is combined with picture data, to be displayed on a display.

However, since the conventional caption data processing circuit simply decodes only caption data without using a presentation time stamp (PTS), it is difficult to synchronize the decoded caption image data with the picture data, when the decoding time of the caption data is different from the time at which it should appropriately be presented.

SUMMARY OF THE INVENTION

To solve the above problem, it is an object of the present invention to provide a caption data processing circuit for synchronizing decoded caption image data with picture data based on a presentation time stamp (PTS).

It is another object of the present invention to provide a caption data processing method for synchronizing decoded caption image data with picture data based on a presentation time stamp (PTS).

To achieve the first object, there is provided a caption data processing circuit comprising extracting means and caption decoding means. The extracting means extracts presentation information and caption data from an input transport stream, to generate a control signal when the caption data of a one-picture unit has been extracted. Also, a caption decoding means decodes the extracted caption data in response to the control signal, to control presentation timing of the decoded caption data based on the presentation information.

To achieve the second object, there is provided a caption data processing method, comprising the steps of:
(a) extracting presentation information and caption data from an input transport stream (TS), and generating a control signal when the caption data of a one-picture unit has been extracted; and
(b) decoding the extracted caption data in response to the control signal and controlling presentation timing of the decoded caption data based on the presentation information.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
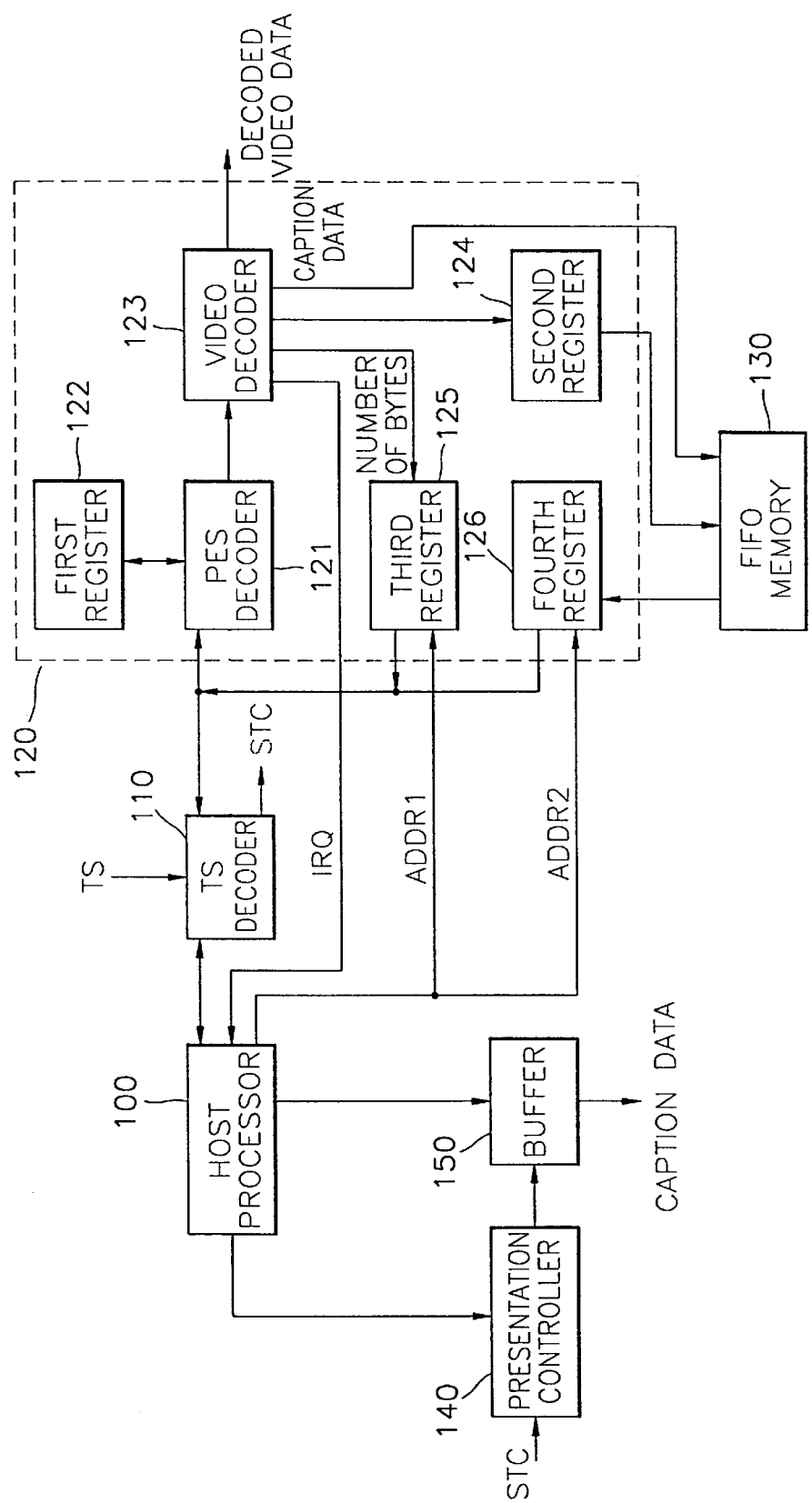
FIG. 1 is a block diagram of a caption data processing circuit according to a preferred embodiment of the present invention.

In FIG. 1, a host processor 100 controls writing and reading of data required for a transport stream (TS) decoder 110 and an MPEG video decoder 120, as well as controlling the decoding of the overall system. Also, the host processor 100 decodes extracted caption data to generate intended caption image data. The TS decoder 110 parses an input TS, and outputs a packetized elementary stream (PES) to a PES decoder 121 and system time clock (STC) to a presentation controller 140.

The PES decoder 121 of the MPEG video decoder 120, removes a PES packet header from the PES output by the TS decoder 110, extracts a presentation time stamp (PTS) and a decoding time stamp (DTS) from the PES packet header, and then temporarily stores the PTS and DTS in a first register 122.

Here, the PES packet header includes PTS and DTS fields, which are used to maintain lip-sync during the decoding of multiplexed audio, video or other elementary streams. In a picture layer, an intra-coded (I) picture and a predicted-coded (P) picture include both PTS and DTS, while a bidirectionally-coded (B) picture includes only PTS.

Figure 2:
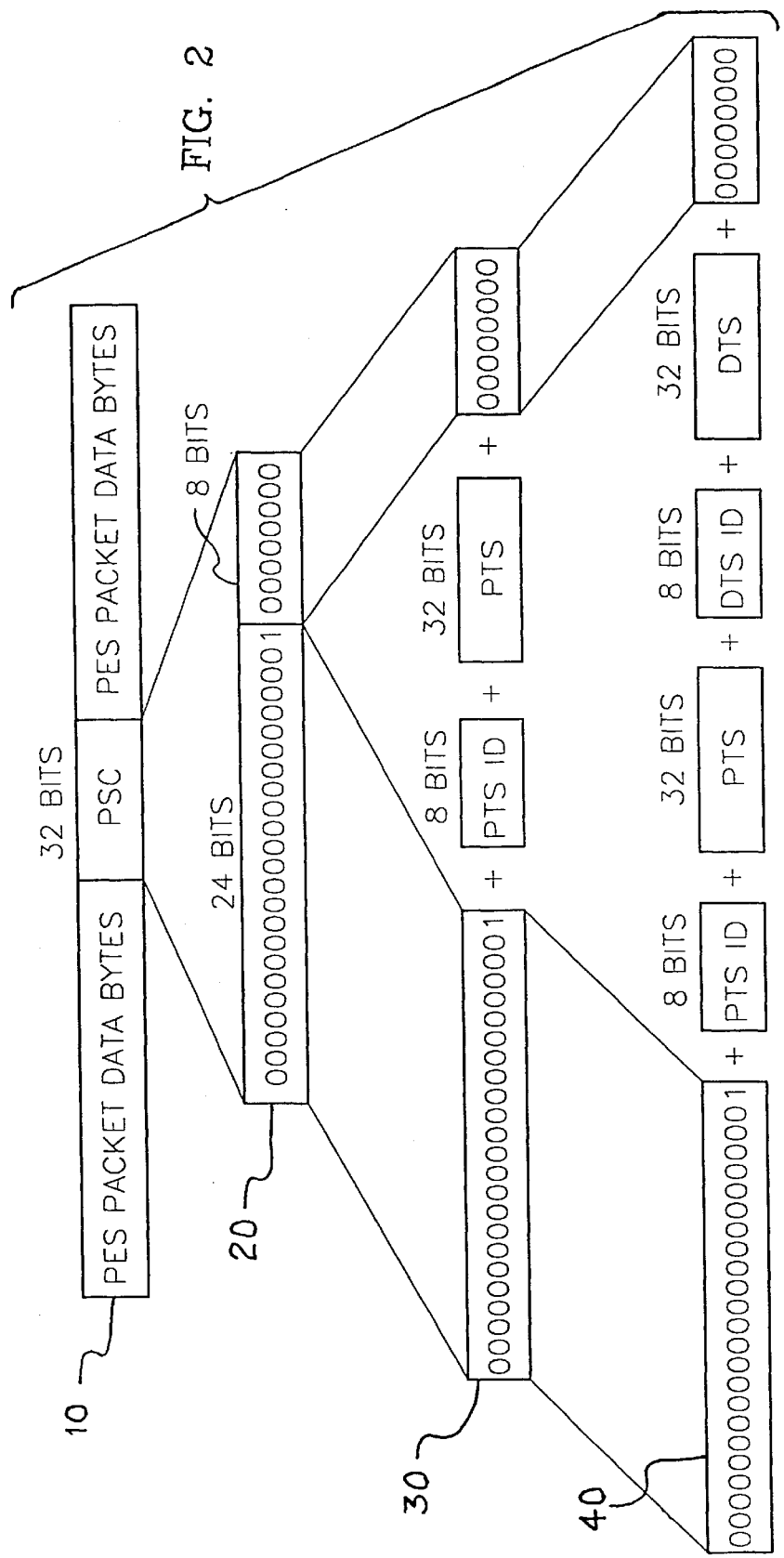
FIG. 2 is a diagrams for explaining operation of the PES decoder of FIG. 1.

As shown in FIG. 2, the PES decoder 121 inserts the PTS, or PTS plus DTS, stored in the first register 122, into a picture start code (PSC) of data representation 10, if a 32-bit PSC is detected in an elementary stream from which the PES packet header is removed. This is to discriminate the 32-bit PSC from the other start code values when a video decoder 123 decodes the elementary stream. The PSC has a 24-bit start code value of "000000000000000000000001" and an 8-bit start code value of "00000000" as shown in the exploded data representation 20 in FIG. 2.

Thus, when the current picture has only PTS, the PES decoder 121 inserts an 8-bit PTS ID which does not coincide with any picture start code value of the MPEG video syntax, and 4-byte (32-bit PTS) of the 33-bit PTS stored in the first register 122, between the 24-bit start code value and the 8-bit start code value of the output elementary stream, as shown in exploded data representation 30 in FIG. 2. This is all then output to the video decoder 123.

Also, when a picture start code value is found and the picture corresponding to the picture start code value has both PTS and DTS, the PES decoder 121 inserts an 8-bit PTS ID which does not coincide with any picture start code value of the MPEG video syntax, 4-byte (32-bit) PTS of the 33-bit PTS stored in the first register 122, an 8-bit DTS ID which does not coincide with any picture start code, and 4-byte (32-bit) DTS of the 33-bit DTS stored in the first register 122, between the 24-bit start code value and the 8-bit start code, as shown in exploded data representation 40 in FIG. 2.

This is all then output to the video decoder 123.

Here, since the PTS and DTS are extra information, 32 bits of the 33-bit PTS and DTS may be used, providing a low resolution. Also, the ID values of the PTS and DTS, which are not allowed in the initial MPEG syntax, can be detected by the video decoder 123, so that the decoded picture data can be synchronously displayed even though the presentation time and decoding time are not synchronized.

The video decoder 123 decodes a video elementary stream output from the PES decoder 121, to output decoded video data. The video decoder 123 also temporarily stores the 4-byte PTS in a second register 124 if the PTS ID is detected in the elementary stream output from the PES decoder 121. Additionally, the video decoder 123 extracts caption data from the bit stream output from the PES decoder 121, which is transferred to a user_data field of the MPEG syntax, to write in a first-in first-out (FIFO) memory 130 the extracted caption data together with the PTS stored in the second register 124, and to write in a third register 125 the size in bytes of the caption data corresponding to one picture.

Figure 3:
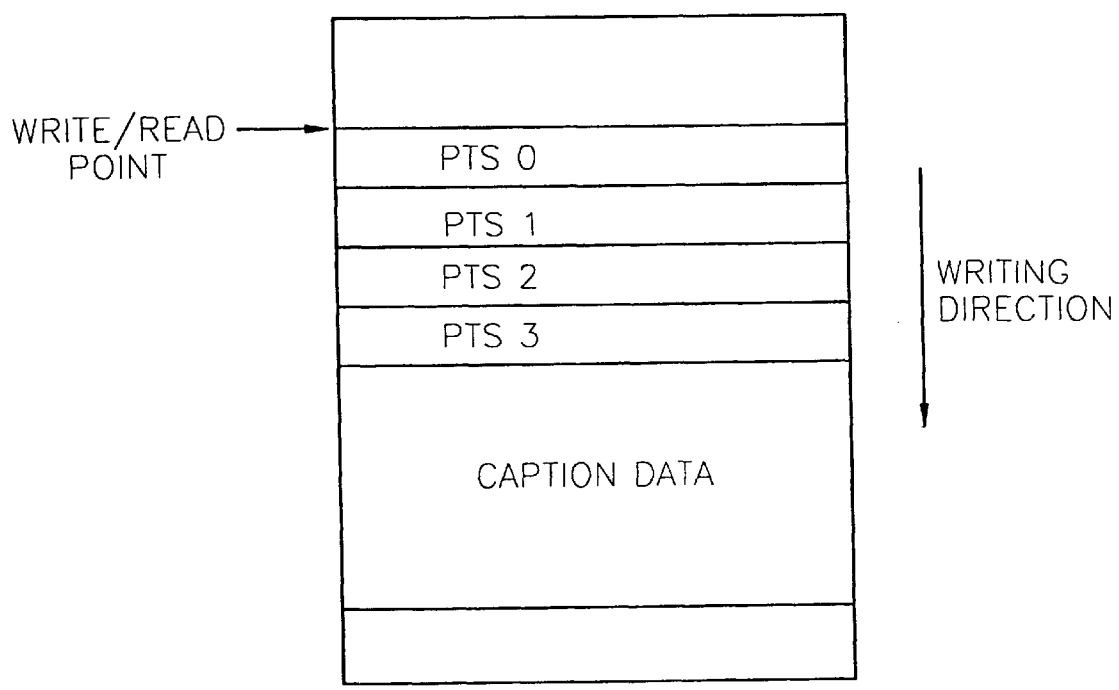
FIG. 3 is a diagram showing the structure of the FIFO memory of FIG. 1.

FIG. 3 is a diagram showing the data writing structure of the FIFO memory 130. In the FIFO memory 130, 4 bytes of PTS per picture are written, together with the caption data, whenever the caption data is detected, for subsequent display. According to the writing sequence, the PTS read from the second register 124 is written from the most significant byte to the least significant byte, and then M bytes of caption data corresponding to one picture, output from the video decoder 123, are written. Consequently, the data corresponding to one picture, written in the FIFO memory 130, are the 4-byte PTS and M-byte caption data.

On the other hand, after the writing of the caption data corresponding to a single picture in the FIFO memory 130 is completed, the video decoder 123 generates an interrupt signal IRQ for output to the host processor 100. When the host processor 100 detects the interrupt signal IRQ, the data is read from the FIFO memory 130 in the following sequence to decode the caption data.

First, the host processor 100 transmits a first address ADDR1 to a third register 125 in order to read from the third register 125 the size (in bytes) of the caption data of the corresponding picture stored in the FIFO memory 130. Then, the third register 125 transfers to the host processor 100 information of the size in bytes of the caption data of the corresponding picture, via the TS decoder 110.

Here, after the host processor 100 recognizes the size in bytes (4+M bytes) of the caption data of the corresponding picture to be read, it transmits a second address ADDR2 to a fourth register 126 in order to read from the FIFO memory 130 the PTS and caption data successively, according to the size in bytes to be read which has been recognized via the fourth register 126. Before generating the above-described interrupt signal IRQ, the video decoder 123 moves the first byte data of the FIFO memory 130 into the fourth register 126, and moves one byte of the following data of the FIFO memory 130 into the fourth register 126 whenever the host processor 100 reads the data in units of one byte stored in the fourth register 126.

The PTS and the caption data, read from the FIFO memory 130 according to the above method in units of one picture, are transferred to the host processor 100, by means of the fourth register 126 of the MPEG video decoder 120 and the TS decoder 110. The host processor 100 decodes the transferred caption data and stores the decoded caption data in a buffer 150. The host processor 100 outputs the transmitted PTS to a presentation controller 140. The buffer 150 is provided to allow the caption data to be synchronized with the picture to be displayed, considering a delay time due to format conversion by a format converter (not shown, located at the output of the video decoder 123).

The presentation controller 140 controls the presentation timing of the caption data stored in the buffer 150, with reference to the PTS output from the host processor 100 and the STC output from the TS decoder 110. This is done in order to easily synchronize the caption data with the picture data to be displayed. The caption image data is synchronously multiplexed with the final output picture data.

In addition, since the extracted caption data can be transferred to the host processor 100 in the picture decoding sequence by the video decoder 123, the presentation controller 140 can synchronize the decoded caption data with the final output picture data, even when the decoding time and the presentation time do not coincide with each other, as in the case of a B-picture.

In the caption data processing circuit and the associated data processing method described above, according to the present invention, the presentation timing of the caption data is controlled based on the PTS so as to exactly synchronize the picture data with the caption data, the PTS and caption data being extracted from the transport stream. As a result, the caption is correctly displayed at the same time as the picture to which it corresponds.

Although the present invention has been described above in terms of a preferred embodiment, it will be appreciated that various changes and modifications can be made to the described embodiment without departing from the spirit and scope of the invention.

What is claimed is:

1. A caption data processing circuit, comprising:

an extracting circuit that extracts presentation information and caption data from an input transport stream to generate a control signal when caption data has been extracted;

a caption decoder that decodes the extracted caption data in response to the control signal, to control timing of presentation of the decoded caption data based on the presentation information; and a memory for storing the extracted presentation information and caption data, wherein the extracting circuit comprises:

a video decoder for extracting the presentation information and the caption data from the input transport stream to output the presentation information, information about the amount of caption data, and the caption data, and generating said control signal when caption data has been extracted;

a first buffer for temporarily storing the information about the amount of caption data extracted by the video decoder; and a second buffer for reading from the memory the presentation information and the caption data, in units of a predetermined number of bytes, wherein presentation information and caption data, in units of said predetermined number of bytes, are temporarily stored in said second buffer.

2. The caption data processing circuit of claim 1, wherein said caption decoder comprises:

a host processor for reading from said second buffer the presentation information and the caption data, in response to the control signal, and decoding the read caption data to output the decoded caption data;

a third buffer for temporarily storing the decoded caption data; and a presentation controller for controlling the presentation timing of the caption data stored in said third buffer, based on the presentation information output from the host processor.

3. The caption data processing circuit of claim 2, wherein said host processor generates a first address, for reading from said first buffer information about the amount of caption data stored, and a second address, for reading from said second buffer the caption data corresponding to the read information about the amount of caption data, in response to the control signal.

4. A caption data processing circuit comprising:

a transport stream (TS) decoder for extracting a packetized elementary stream (PES) from an input TS;

a PES decoder for removing a PES packer header from the PES to extract video elementary stream, for extracting a presentation time stamp (PTS) and a decoding time stamp (DTS) from the PES packer header, and for inserting the extracted PTS and DTS into the extracted video elementary stream;

a video decoder for extracting PTS and caption data from the video elementary stream output from the PES decoder, and for generating an interrupt signal when the caption data has been extracted;

a first-in first-out (FIFO) memory for storing the extracted PTS and caption data;

a host processor for reading the PTS and caption data from said FIFO memory in response to said interrupt signal, and for decoding the read caption data to output the decoded caption data; and a presentation controller for controlling the presentation timing of the decoded caption data, based on the PTS output from said host processor.

5. The caption data processing circuit of claim 4, wherein said presentation controller further comprises a buffer for temporarily storing the decoded caption data.

6. The caption data processing circuit of claim 5, wherein the TS decoder extracts a system time clock (STC) from the TS, and the presentation controller controls the presentation timing of the decoded caption data output from the buffer based on the extracted STC and PTS.

7. The caption data processing circuit of claim 4, further comprising:

a first register for temporarily storing the PTS and DTS output from said PES decoder until the PTS and DTS are inserted by said PES decoder into the extracted video elementary stream;

a second register for temporarily storing the PTS extracted by said video decoder and then providing the extracted PTS to said memory;

a third register for temporarily storing the size in bytes of the caption data extracted by said video decoder, before it is provided to said host processor; and a fourth register for reading the PTS and caption data stored in the FIFO memory, in units of a predetermined number of bytes, to temporarily store the PTS and caption data therein.

8. The caption data processing circuit of claim 7, wherein said host processor generates a first address for reading from said third register the size in bytes of the caption data, and a second address for reading from said fourth register the caption data corresponding to the read size in bytes, in response to said interrupt signal.

9. A caption data processing method, comprising the steps of:

(a) extracting presentation information and caption data from an input transport stream (TS) and generating a control signal when caption data has been extracted from the TS;

(b) decoding the extracted caption data in response to the control signal; and (c) controlling presentation timing of the decoded caption data based on the presentation information, wherein the step (a) comprises the sub-steps of:

(a1) extracting the presentation information and the caption data from the input TS, to output the presentation information, information about the amount of caption data, and the caption data;

(a2) generating the control signal when the caption data has been generated in the step (a1);

(a3) temporarily storing the information about caption data;

(a4) temporarily storing the presentation information and the caption data extracted in the step (a1).

10. The caption data processing method of claim 9, wherein the step (b) comprises the sub-steps of:

(b1) reading the information about the amount of caption data stored in the step (a3), in response to the control signal;

(b2) reading the presentation information and the caption data stored in the step (a4) according to the read information about the amount of caption data;

(b3) decoding the read caption data to output the decoded caption data; and (b4) temporarily storing the decoded caption data.

11. The caption data processing method of claim 10, wherein the step (c) includes reading the decoded caption data stored in the step (b4) based on the presentation information read in the step (b2), to control the presentation timing of the decoded caption image data.

12. A caption data processing method comprising the steps of:

(a) extracting a packetized elementary stream (PES) from an input transport streams (TS);

(b) removing a PES packet header from the PES to extract a video elementary stream, extracting a presentation time stamp (PTS) and a decoding time stamp (DTS) from the PES packet header, and inserting the extracted PTS and DTS into the extracted video elementary stream to form an augmented video elementary stream;

(c) extracting the PTS and caption data from the augmented video elementary stream, and generating an interrupt signal when the caption data has been extracted;

(d) decoding the extracted caption data in response to the interrupt signal to output the decoded caption data; and (e) controlling the presentation timing of the decoded caption data based on the extracted PTS.

13. The caption data processing method of claim 12, wherein the step (a) further comprises the sub-step of extracting a system time clock (STC) from the TS.

14. The caption data processing method of claim 13, wherein in the step (e), the presentation timing of the decoded caption data is controlled based on the extracted STC and PTS.

15. A caption data processing circuit, comprising:

a video decoder that extracts presentation information and caption data from an input transport stream and outputs the presentation information, information about the amount of caption data, and the caption data, and that generates a control signal when caption data has been extracted;

a caption decoder that decodes the extracted caption data in response to the control signal and controls when the decoded caption data is presented based on the presentation information;

a first memory for storing the information about the amount of caption data extracted by the video decoder; and a second memory that stores the extracted presentation information and the extracted caption data, wherein said caption decoder comprises:

a host processor that reads the presentation information and the caption data from said second memory in response to the control signal and decodes the read caption data to output the decoded caption data;

a third memory for storing the decoded caption data; and a presentation controller for controlling when the caption data stored in said third memory is presented based on the presentation information output from the host processor.

16. The caption data processing circuit of claim 15, wherein said host processor generates a first address, for reading from said first memory, information about the amount of caption data stored, and a second address, for reading from said second memory, the caption data corresponding to the read information about the amount of caption data, in response to the control signal.

* * * * *